July 12, 1966 W. J. ENGSTROM 3,260,386
TRACTOR-MOUNTED SCOOP
Filed Oct. 15, 1963 4 Sheets-Sheet 1

INVENTOR.
WILLIAM J. ENGSTROM
BY
Reynolds + Christensen
ATTORNEYS

July 12, 1966 W. J. ENGSTROM 3,260,386
TRACTOR-MOUNTED SCOOP
Filed Oct. 15, 1963 4 Sheets-Sheet 2
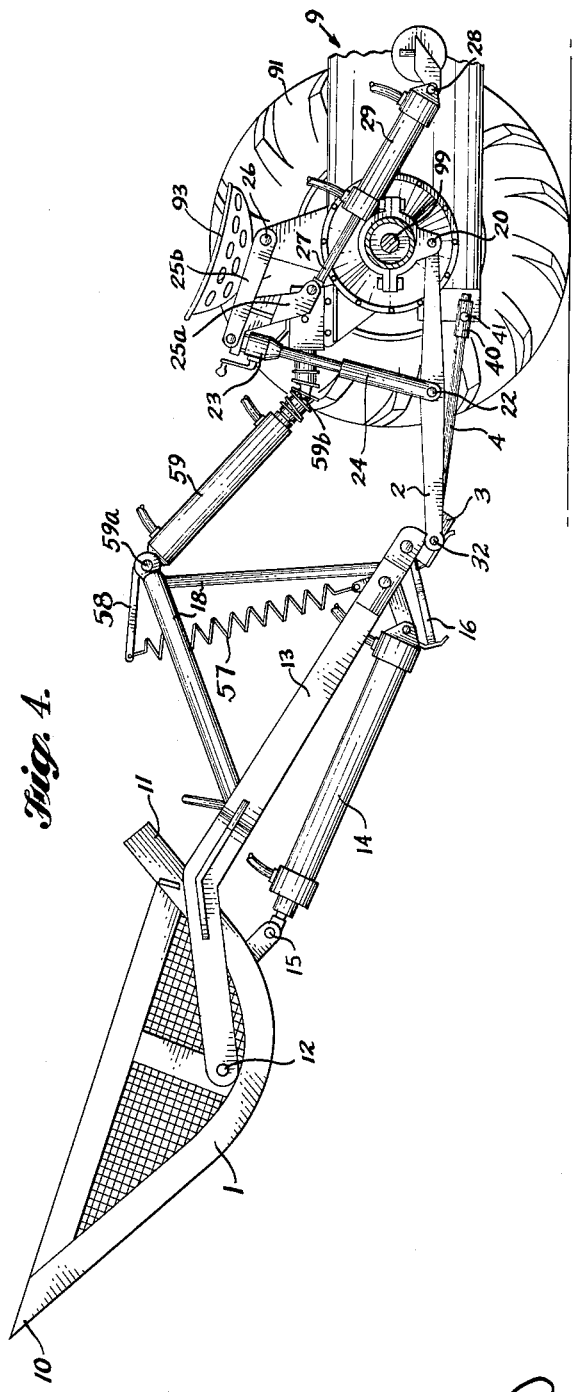
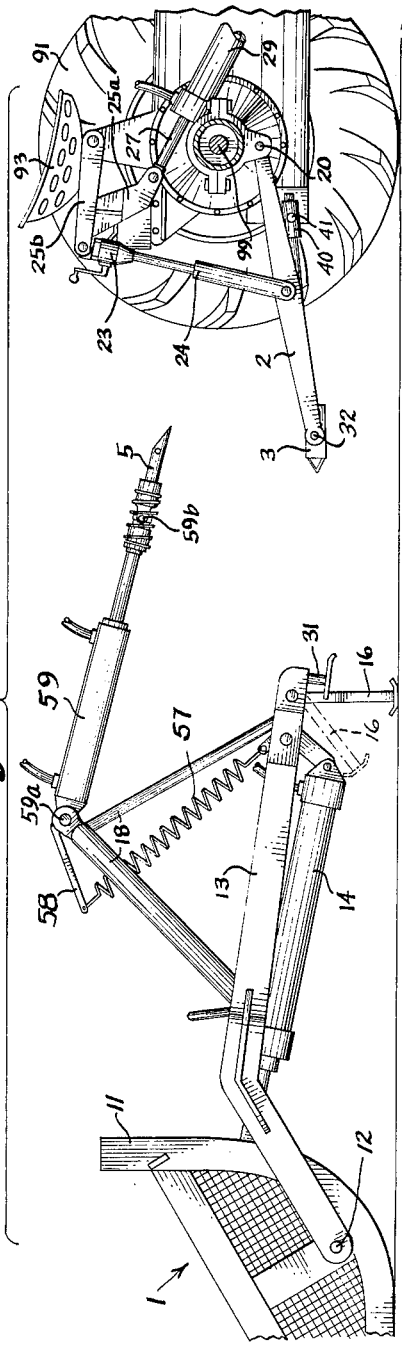
INVENTOR.
WILLIAM J. ENGSTROM
BY
Reynolds & Christensen
ATTORNEYS July 12, 1966  W. J. ENGSTROM  3,260,386
TRACTOR-MOUNTED SCOOP Filed Oct. 15, 1963  4 Sheets-Sheet 3

INVENTOR.
WILLIAM J. ENGSTROM
BY
Reynolds & Christensen
ATTORNEYS

July 12, 1966  W. J. ENGSTROM  3,260,386
TRACTOR-MOUNTED SCOOP
Filed Oct. 15, 1963  4 Sheets-Sheet 4
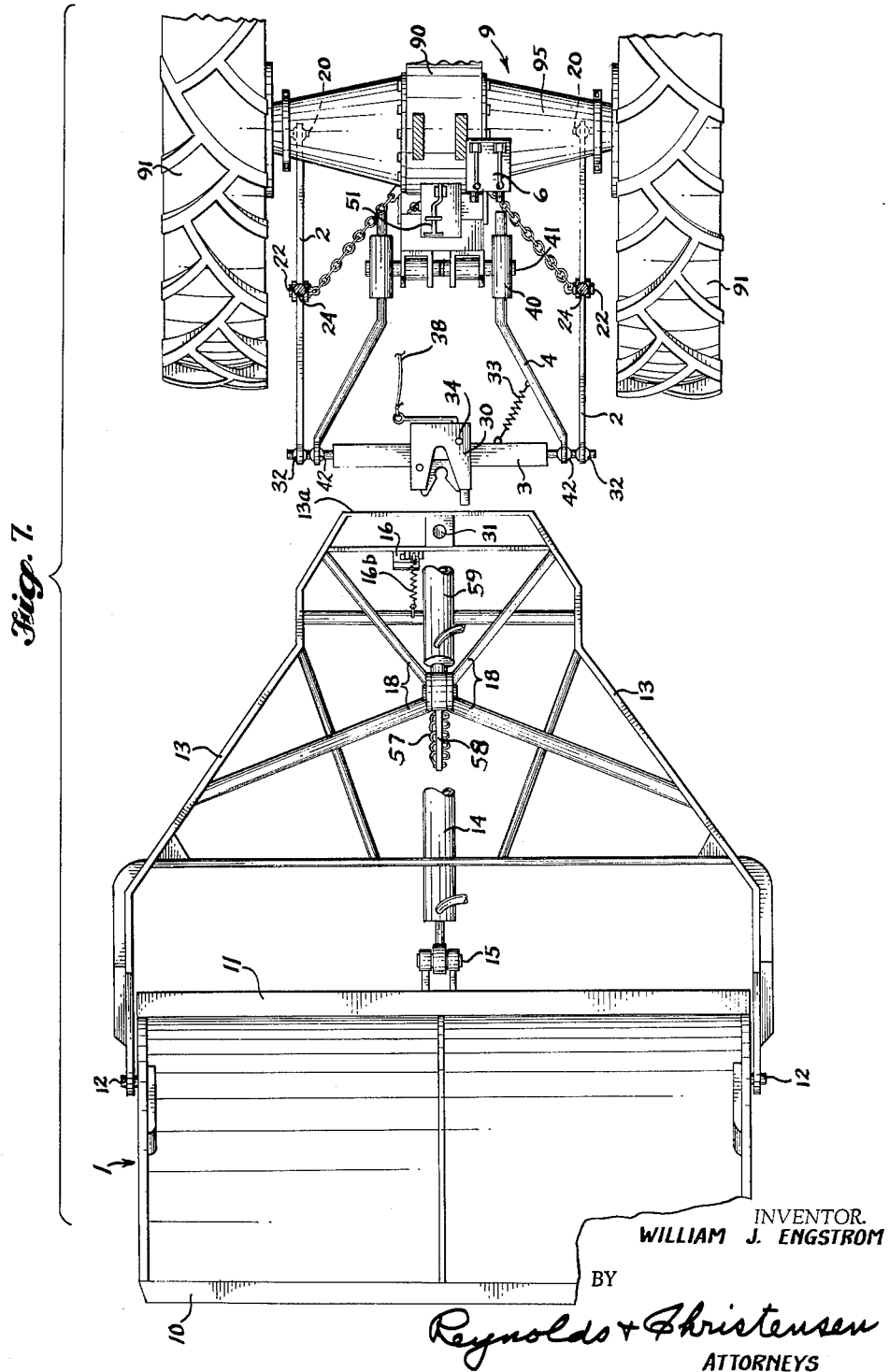
INVENTOR.
WILLIAM J. ENGSTROM
BY
Reynolds + Christensen
ATTORNEYS

United States Patent Office 3,260,386
Patented July 12, 1966

3,260,386
TRACTOR-MOUNTED SCOOP
William J. Engstrom, 5608 E. Mt. Tacoma Drive,
Puyallup, Wash.
Filed Oct. 15, 1963, Ser. No. 316,223
16 Claims. (Cl. 214—140)

The present invention concerns a scoop so mounted upon the rear end of a tractor as to be capable of use for various purposes. On a farm the scoop may be used, for example, to clean out a barn, for dumping manure into a spreader or for transporting dirt from place to place; it can be employed as a blade to smooth over irregular surfaces, either while moving forwardly or rearwardly. The scoop and certain of the actuating mechanism for the same preferably are detachably mounted upon the tractor, whereby the tractor may be used with other equipment, and while the mechanical means for attachment and detachment of the scoop are part of a separate invention, disclosed more fully and claimed in a companion application, Serial No. 316,393, filed October 15, 1963, the ability to attach and detach the scoop, and the structure of the scoop and of the tractor enabling such attachment and detachment, are a part of this present invention.

One purpose of this invention is to provide operating mechanism for a scoop (and in particular for a detachably mounted scoop) capable not only of lifting the scoop and its load sufficiently off the ground to enable transportation of the load over short distances, but also capable of lifting the load high above the ground, so that the load may be dumped into a truck or into a manure spreader, for example, yet so arranged that despite the rather appreciable leverage of a system of long arms that support the scoop at a distance from the tractor, the scoop can still handle an appreciable load without overbalancing the front end of the tractor.

It is also an object of the invention to arrange the mechanism so that leverages improve as the load is elevated, thereby facilitating the lifting and avoiding excessive stresses, or the necessity for excessive strengthening and added weight at the front of the tractor as a counterbalance or to resist large stresses.

One important object is to arrange the mechanism and the points where it is attached to the tractor in such manner, with relation to the tractor's rear driving wheels, that all added weight, both of the scoop and of its load, and especially when the scoop is horizontally distant from the tractor, is so nearly balanced against the weight of the engine and the forward steering wheels, that the added load affords primarily additional weight to the traction wheels, enabling the tractor when loaded to move about under adequate control, even in areas where the ground is so soft or slippery as otherwise to afford inadequate traction.

It is a related object to arrange the load in relation to the weight distribution of the tractor that when the load is supported farthest from the tractor, the tractor is stably supported from the ground, and cannot overturn forwardly nor backwardly.

It is a further object to arrange the mechanism in a manner that will resist appreciable lateral sway, while still permitting some such sway, and that will always permit all necessary vertical movement of the mechanism relative to the tractor.

With such objects in mind, and others which will appear more clearly as this specification proceeds, the invention comprises the structure shown in the accompanying drawings in a preferred form, and as described hereinafter; the invention will be defined in the claims which are part of this specification.

FIGURE 3 is a side elevational view of both parts of the mechanism, separated but in position for recoupling, and FIGURE 4 is also a side elevational view, with the parts recoupled and the scoop partially elevated.

FIGURE 7 is a plan view of the rear end of the tractor, with its tractor-mounted mechanism, and of the scoop, in positions for coupling the two.

Figure 1:
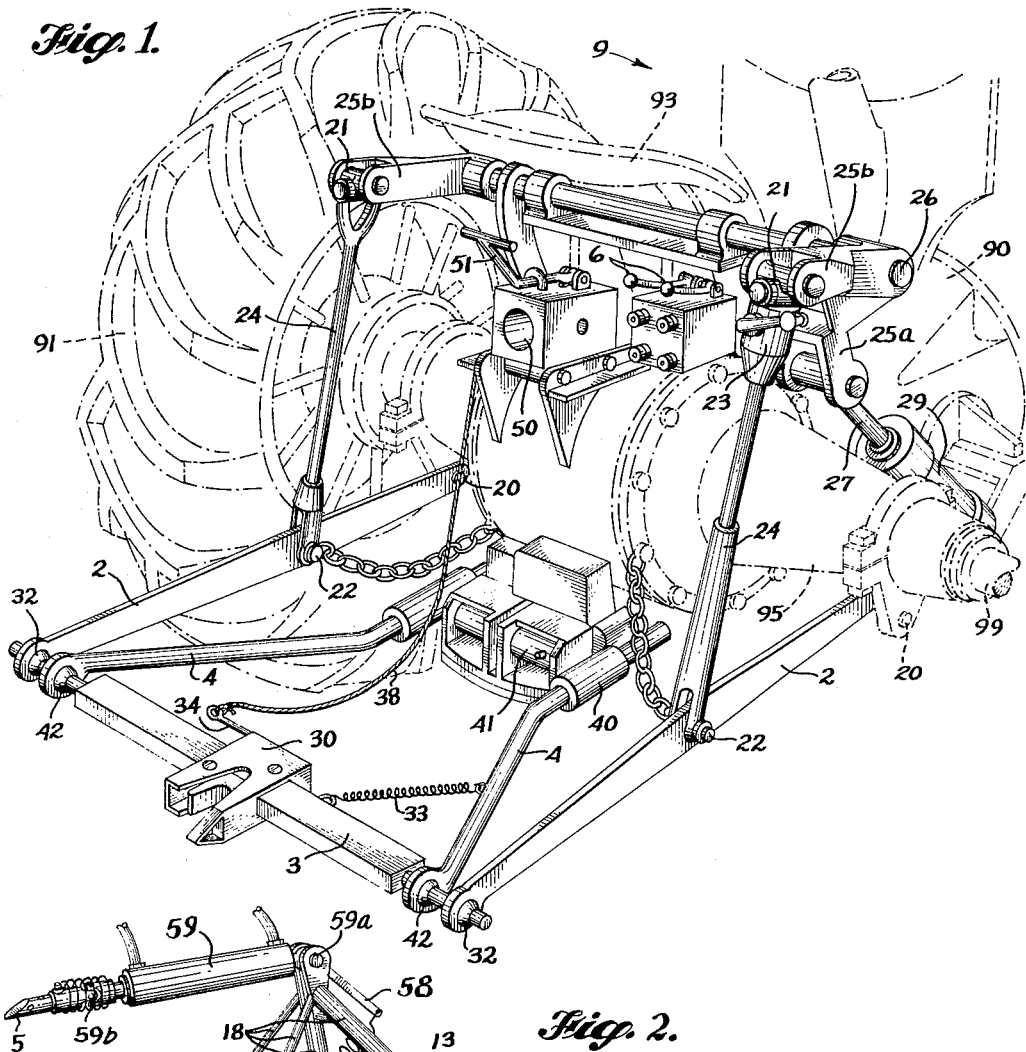
FIGURE 1 is a perspective view of the rear end of the tractor, and of the tractor-mounted mechanism, the scoop itself and the immediately associated mechanism being detached, and shown in perspective in FIGURE 2.

The invention comprises a scoop supported pivotably at the end of extension arms that are in turn pivotally mounted at the swinging end of lift arms pivoted to the tractor in the general vertical plane of the drive axle, all such arms extending rearwardly. The lift arms are swingable upwardly and downwardly, which affords a certain amount of lift to the scoop, by jack means carried by the tractor. In addition the scoop can be elevated by swinging the extension arms about their pivot axis upon the lift arms, under the influence of other jack means reacting between the tractor and the extension arms, in a line above the lift arms and extension arms. The scoop can be tilted about its transverse pivotal mount upon the swinging end of the extension arms, for dumping or for positioning in scraping or leveling position, the tilting being under control of a third jack reacting between the extension arms and the scoop. The several pivot axes are located so that the leverage, particularly in high lift situations, is advantageous. The weight of a load is carried in such relation to the forwardly disposed weight of the tractor's engine and forward steering wheels that traction on the rear driving wheels is improved by substantially the entire weight of the load and of the tractor itself concentrated on the rear wheels, yet when the loaded scoop is fully extended, by engagement with the ground it will preclude overbalancing of the tractor. The scoop, the extension arms, and the scoop's attitude control jack all constitute part of a separable unit, quickly connectable to and disconnectable from the lift arms and from the tractor, so that when disconnected the tractor can be used to perform other work, alone or with other equipment. The mechanism that effects lifting of the scoop is sway-braced from the tractor in a manner to limit lateral swaying of the scoop, yet affording sufficient freedom of movement in various directions. A representative form of the invention is shown in the drawings, and will now be described.

Figure 5:
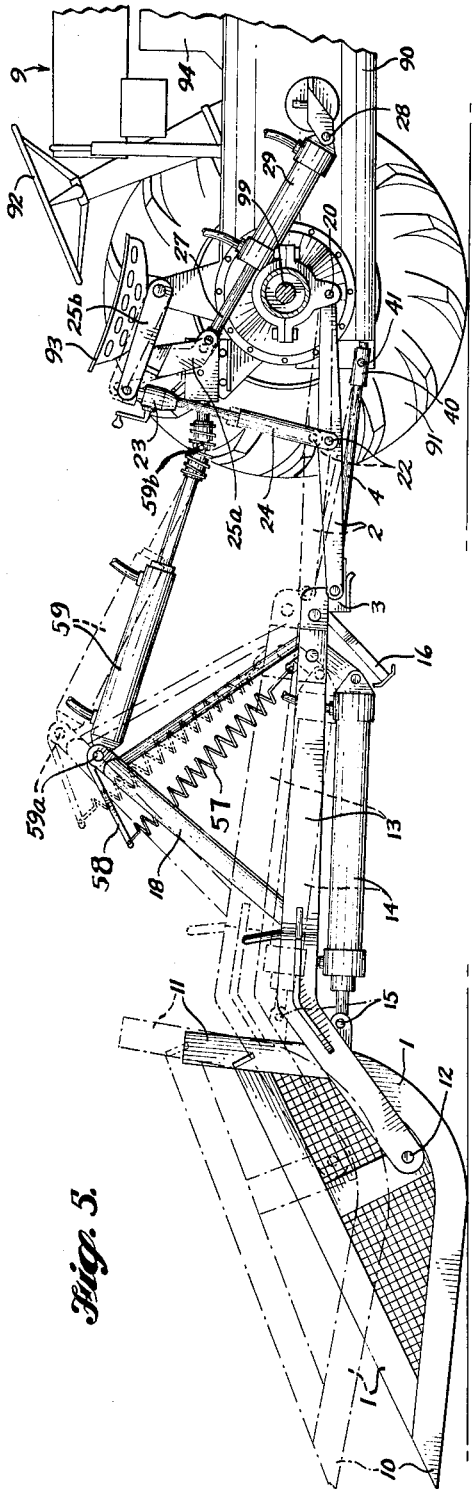
FIGURE 5 is a side elevational view of the assembled mechanism, showing the scoop supported on the ground, and illustrating in dash lines the scoop sufficiently elevated to enable it and the tractor to move from place to place.

The particular form of the tractor 9 is immaterial, and a representative form has been shown. It includes a frame or chassis 90, in the housing 95 whereof is journaled a rear axle 99 carrying driving wheels 91; the front of the chassis is supported by steerable wheels (not shown) controlled by the steering wheel 92 from the operator's seat 93, which normally faces forwardly. The engine is partly shown at 94 (FIGURE 5).

Pivotally mounted at 20, beneath and substantially in the same vertical plane as the axle 99, are rearwardly directed lift arms 2, one at each side of the tractor. The location of the pivot at 20 is dependent upon the mechanical advantage of the scoop-supporting leverage and the scoop's capacity, and upon the forward weight of the tractor. If these factors are so related that the load will tend unduly to lift the front wheels from the ground, the pivot 20 may be located somewhat further forward, or conversely, it may be preferable to locate it further to the rear. It is desirable that the load be so balanced relative to the tractor's forward weight, with the pivot 20 located as described, that substantially the entire weight of tractor and load is concentrated upon the wheels 91. The arms 2 are swingable in vertical planes, closely inside the rear wheels 91, by jack means, one jack at each side, each including a cylinder 29 pivotally mounted at 28 upon the chassis, and a plunger reciprocable therein, of which only the piston rod 27 is shown. The connection between the rod 27 and the lift arm 2 includes a rock shaft 26, journaled upon the chassis, a two-part lever 25a and 25b upon the rock shaft, the rod 27 being connected to one part 25a, and the second part 25b being connected to the lift arm 2 by a link 24 which at one side is threadedly or otherwise adjustable in length, under control of the adjusting mechanism at 23. The links 24 connect to the lift arms 2 at 22, well to the rear of the arms' pivot at 20, and the connection to the lever part 25b at 21 is preferably by means of a universal joint, permitting some lateral movement of links 24, as well as forward and rearward movement; see FIGURE 1. Corresponding limited lateral movement of lift arms 2 is permitted by means of appropriate looseness of their pivot at 20.

The swinging ends of the lift arms 2 are joined transversely by a bar 3, the ends whereof are pivotally connected to the arms 2 for rotation on a transverse axis, but preferably also for slight elevational movement of one arm 2 relative to the other under the influence of the adjustment at 23, and for slight transverse swaying of the lift arms relative to the chassis. To this end the interconnections at 32 are preferably ball-and-socket joints or the like. The bar 3, centrally between its ends, supports one element 30 of a quickly engageable and disengageable joint—the details of which are described in the companion application Serial No. 361,393, referred to above. The complemental joint element, such as the pin 31, is carried by a bar 13a, part of the apparatus, that abuts the bar 3 to prevent sidewise swinging of the apparatus, such as the scoop, which is to be actuated from the tractor, and which will be referred to hereinafter. The bar 3 is held from unwanted rotation about its pivots at 32, with the joint element 30 level, when the scoop is detached, by means such as the tension spring 33.

Since appreciable side sway of the supported scoop is undesirable, yet limited side sway is desirable, this is limited by providing sway bars 4, offset at their ends, their forward ends being somewhat loosely guided in forwardly and rearwardly directed sleeves 40, ahead of the pivot at 20, and pivotally mounted upon the chassis at 41 for movement in a vertical plane (compare FIGURES 3 and 6 for example), and their rearward ends being connected by ball-and-socket joints at 42 to the respective ends of the bar 3, outwardly of the axes of sleeves 40. The forward ends of the sway bars 4 can slide lengthwise within and rotate relative to the sleeves, or either such sway bar can move limitedly relative to its sleeve more than the movement of the other sway bar relative to its sleeve.

In addition to the tractor-mounted equipment thus far described, there is a second coupler of which one part 50 is fixed rigidly to the chassis, and a complemental part 5 (see FIGURES 2 and 3) is carried by the scoop, or its actuating mechanism. In effect one is a socket wherein the other is receivable by relative movement in the forward and rearward direction, with means to retain the parts removably in engagement. The details of this coupler are described in my companion application Serial No. 316,393.

Figure 6:
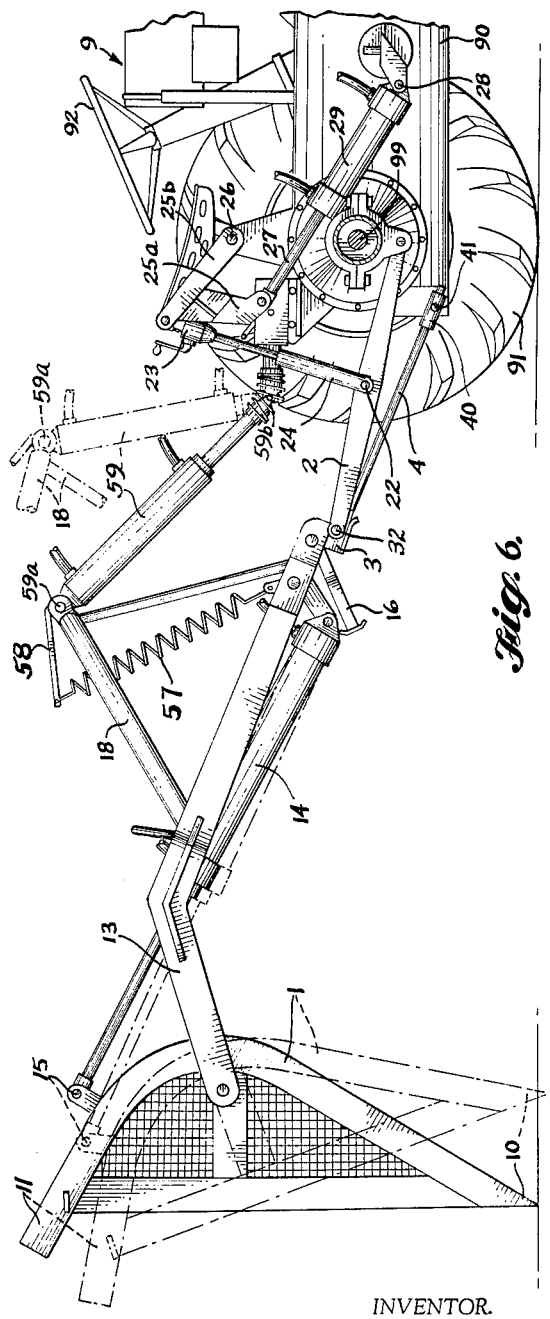
FIGURE 6 is a side elevational view, showing the scoop in positions for use as a leveler.

The scoop, generally indicated by the numeral 1, includes a blade portion 10 which contacts the ground, either to slide beneath material to be lifted, as in FIGURES 3 and 5, or to scrape over and smooth off the surface like a bulldozer blade, as in FIGURE 6, either while moving forwardly or backwardly. It includes also a back 11 to retain material that is being scooped up. The scoop as a whole is pivotally mounted to oscillate about a transverse axis at 12 upon the swinging ends of extension arms 13, rearwardly divergent from its coupler element, such as the upright pin 31, which is releasably received in the coupler element 30, already described. When coupled the scoop rocks with the bar 3, but not laterally relative thereto. Disposition of the scoop about the axis at 12 is governed by a jack means 14, reacting between the extension arms 13, near their forward ends, and the scoop 1 at a position 15.

The disposition of the extension arms 13 about their pivot axis at 32 upon the lift arms 2 is of importance. Two jack means cooperate to achieve such disposition. A pyramidal skeleton structure at 18, rising above the arms 13, supports at its apex, well above a line joining the pivots at 20 and 32, a pivotal connection 59a for the rearward end of a jack 59. At the forward end of the jack the coupler 5 is mounted for movement forwardly and rearwardly relative to the connection at 59a, and this forward end is anchored to the complemental coupler element 50 that is fixed upon the tractor. A flexible joint at 59b allows the jack 59 to swing upwardly and downwardly at its rear end relative to the tractor, yet the jack means 59 reacts solidly between the tractor at 50 and the extension arm and scoop-supporting structure 59a. A lever arm 58 is rigid with the jack 59a, and extends to the opposite side of its pivot at 29, whereby an extension spring 57 serves to counterbalance the weight of the jack 59 when disconnected, and to support its coupler 5 more or less at a level to enter the complemental coupler 50, for reengagement.

It is important that the scoop and its supporting mechanism are supported at the rear of the tractor, and extend rearwardly therefrom. The real wheels 91 are the traction wheels, and the greater the load concentrated thereon the greater is the traction afforded, even on slippery ground. The location of the scoop ahead of the tractor would tend to counterbalance the weight upon the rear wheels, and to lift them off the ground but the rearward mounting, while it tends to lift the front wheels, in effect concentrates the entire weight of the tractor and its load upon the rear tractive wheels 91. Even if the front wheels have insufficient engagement with the ground for efficient steering, the tractor can be steered by braking one or the other rear wheel 91. The tractor cannot overturn rearwardly nor forwardly, for the loaded scoop, in its rearwardly outstretched position will ride over or engage the ground to prevent rearward tilting, while the front wheels preclude forward tilting. Moreover, the rear-mounted scoop is readily visible to the operator, not obscured by the engine as it would be if forwardly mounted.

Figure 2:
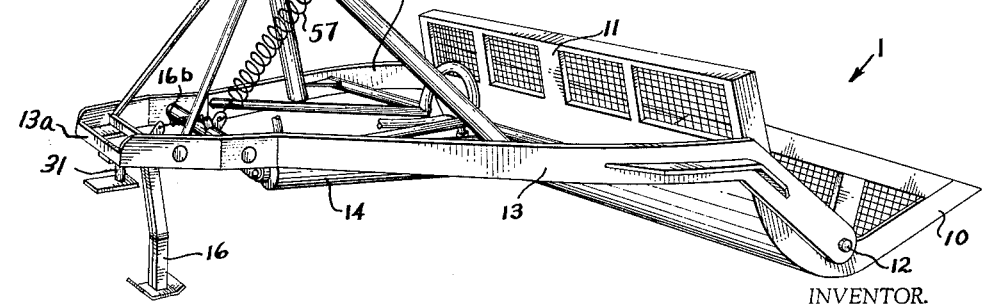

Let us assume that the scoop is to be attached to the tractor, and is supported upon the ground, as it is in FIGURES 2, 3 and 7. The forward end of the scoop, with its coupler pin 31, is supported by a leg 16, spring-urged to an upright position, at a level above the ground such that the pin 31 can be readily engaged by the coupler element 30, lifting or lowering the latter by elevation or derpression of the lift arms 2 under the influence of jack means 29, 27 as the tractor backs. If the ground is not level one of the arms 2 can be raised or lowered relative to the other by the adjustment at 23. Once the coupling elements 30, 31 are interengaged the leg 16 swings upwardly, leaving the lift arms 2 freedom of movement without interfering with the ground; see FIGURES 4, 5 and 6.

Pressure fluid supply hoses (not shown in most of the figures to avoid obscuring parts) which extend from a pressure supply source upon the tractor, past control valves 6 (FIGURE 1) located conveniently to the operator are now connected to the jacks 59 and 14; other such hoses will normally remain connected at all times to jacks 29, and the control valve for the same is not shown. The coupler element 5 of jack 59 is guided into engagement at 50. Both connections at 5, 50 and at 30, 31 are self-locking, but can be released by the releasing means at 51 and at 34, respectively; see FIGURE 1.

The scoop is now supported from the tractor by what is in effect a three-point support, at 32, at each side and centrally above at 5, 50. Now if the scoop is to be lowered or raised slightly, this can be done by the lift arms 2 under the influence of jacks 29, 27. Such a lift is illustrated in the dash lines of FIGURE 5. A similar slight lift could be effected by jack 59. A higher lift can be effected wholly by means of jack 59, as in FIGURE 4, or conjointly by jacks 59 and 29, 27, which latter combination gives the highest lift, perhaps in excess of six feet (see the dash line position of the jack 59 in FIGURE 6). Such an extreme lift will permit a load to be dumped from the scoop into a manure spreader, for example, or over the side of and into a truck.

The oscillation of the scoop about the pivot at 12 is controllable during lifting or at any elevation, by means of the jack 14. This will keep the scoop level enough to avoid spilling a load, or the scoop can be rotated into either position shown in FIGURE 6, wherein its blade edge at 10 will scrape or smooth the ground, much as a bulldozer blade, and whether the tractor is moving forwardly or backwardly.

When the particular job for the scoop is completed, the disconnection thereof is accomplished in a few seconds by the releases at 34 and 51, and the disconnection of the hydraulic supply hoses. The leg 16 returns by spring means to its upright position, and supports the arms 13 at a level convenient for reconnection. The coupler elements at 30 and at 50, or at 30 alone, can now be connected to other equipment. For example, a manure spreader having been loaded by the scoop, can be engaged at 30 to be hauled over a field to distribute the manure, or a post-hole auger can be connected at 30 and at 50, whereby it is maintained upright during operation. Thereby the tractor can be used for a variety of jobs, and the farmer is saved much expense for additional equipment.

I claim as my invention:

1. In combination with a tractor and a first fluid-actuated jack mounted thereon, lift arm means pivotally mounted upon the tractor at a location adjacent the ground, to swing upwardly and downwardly about a transverse axis, and operatively connected to said jack to be thus swung thereby, extension arm means pivotally connected directly to the swinging end of the lift arm means to swing relative thereto about a transverse axis, a second fluid-actuated jack connected to said extension arm means, and directly to the tractor at a point above the pivotal mount of the lift arm means thereon, and operable to swing the extension arm means upwardly and downwardly relative to the lift arm means, in any swung position of the latter, and anchorage means for joining the extension arm means to the lift arm means, and for joining the second jack to the tractor, each of which joining means is arranged for quick engagement and disengagement by relative longitudinal movement of the respective parts.

2. The combination of claim 1, wherein the lift arm means comprise two lifting arms spaced apart laterally of the tractor, a single anchorage disposed centrally between and supported from said arms, and wherein the extension arm means include a device engageable with said anchorage and a pair of arms diverging laterally away from said device, and wherein the anchorage means for the second jack includes a pin flexibly connected to the jack and a socket on the tractor for receiving said pin.

3. The combination of claim 2, including lateral sway-bracing means interconnecting the two lift arm means and the tractor.

4. In combination with a tractor and a first fluid-actuated jack mounted thereon, lift arm means pivotally mounted upon the tractor at a location adjacent the ground, to swing upwardly and downwardly about a transverse axis, and operatively connected to said jack to be thus swung thereby, longitudinally directed guide means mounted upon the tractor for pivotal movement about a transverse axis, a sway bar received in said guide means and operatively connected to the lift arm means, at the swinging end thereof, extension arm means pivotally connected directly to the swinging end of the lift arm means to swing relative thereto about a transverse axis, a second fluid-actuated jack connected to said extension arm means, and directly to the tractor at a point above the pivotal mount of the lift arm means thereon, and operable to swing the extension arm means upwardly and downwardly relative to the lift arm means, in any swung position of the latter, and a working tool supported at the swinging end of the extension arm means.

5. In combination with a tractor and with a scoop, a pair of lift arms pivotally mounted at opposite sides of the tractor for swinging in upright planes, and rearwardly directed from their pivot mounts, jack means carried by the tractor and operatively connected to said lift arms, so to swing the latter, a transverse bar pivotally connected at its ends to the swinging ends of the lift arms, a coupler element supported by said transverse bar intermediate its ends, a pair of extension arms joined at their forward ends and extending rearwardly, the scoop being supported at the rearward ends of said extension arms, a coupler element complemental to and interengageable with said first-mentioned coupler element, and supported at the joined forward ends of the extension arms, whereby when the coupler elements are interengaged the extension arms are pivotally supported by said transverse bar upon the swinging ends of the lift arms, and a second jack means mounted upon the extension arms, and including a further coupler element at its forward end, and a coupler element carried by the tractor, offset above the pivot axis of the lift arms, and interengageable with the further coupler element, to enable the second jack means to react from the tractor to elevate the extension arms.

6. The combination of claim 5, wherein the scoop is pivotally mounted upon the swinging ends of the extension arms to oscillate about a transverse axis, and a third jack means carried by the extension arms and operatively connected to the scoop to control oscillation of the latter.

7. The combination of claim 5, including longitudinally directed sway brace bars and guides for one end of the same pivotally mounted upon the tractor for tilting about a transverse axis, said sway brace bars being connected at their opposite ends to the transverse bar.

8. The combination of claim 7, wherein the pivotal connections intermediate the transverse bar and the lift arms include a ball-and-socket joint, to afford freedom of movement of the two ends of the transverse bar within the limits permitted by the sway bars.

9. The combination of claim 5, wherein the jack means for operation of the lift arms comprise two extensible jacks pivotally mounted by one end upon the tractor, a pair of levers pivotally mounted upon the tractor to which the other end of the respective jacks are connected, and links interconnecting each lever and the corresponding lift arm.

10. The combination of claim 9, including means to vary the effective lengths of at least one link relative to the other.

11. The combination of claim 5, wherein the second jack means is pivotally mounted upon the extension arms at a level above the coupler element upon the same arms that engages the first-mentioned coupler element, the further coupler element at the forward end of the second jack means being flexibly connected to the complemental tractor-carried coupler element.

12. The combination of claim 11, including a lever projecting from the forward end of the second jack means, and yieldable means to support the further coupler element at the forward end of the second jack means generally at the level of its complemental tractor-carried coupler element, when uncoupled therefrom.

13. The combination of claim 5, including a ground-engaging leg mounted upon the extension arms, in the vicinity of the coupler element carried by said arms, and in position for engagement by the complemental bar-supported coupler element during engagement of said two coupler elements, said leg being spring-urged into upright supporting position, but being movable upwardly to an inoperative position by engagement of the two coupler elements.

14. The combination of claim 5, wherein a second transverse bar complemental to the transverse bar mentioned therein joins the forward ends of the extension arms, and the second coupler element is carried by said second transverse bar intermediate its ends, the two transverse bars being held in abutting relation when coupled together, and the second coupler elements including a joint that is flexible to allow elevation of the extension arms and of the lift arms.

15. The combination of claim 7, wherein the forward and rearward ends of the sway bars are offset laterally, their rearward ends being spread more widely than their forward and guided ends, and said forward ends and their guides being directed longitudinally, whereby the sway bars may rotate within their guides, as well as reciprocate therein, as their rearward ends are elevated or lowered with the transverse bar to which the same are connected.

16. The combination of claim 15, wherein the guides for the sway bars extend longitudinally, at a level below the pivotal mounts of the lift arms upon the tractor, and each guide is pivotally mounted upon the tractor independently of the other guide.

References Cited by the Examiner
UNITED STATES PATENTS

| | | | |
|---|---|---|---|
| 2,566,657 | 9/1951 | Bartlett | 37—145 |
| 2,712,389 | 7/1955 | Sewell et al. | 214—140 |
| 2,718,718 | 9/1955 | Bartlett | 37—126 |
| 3,002,638 | 10/1961 | Needy | 214—140 |
| 3,198,357 | 8/1965 | Shelby | 214—140 |

HUGO O. SCHULZ, *Primary Examiner.*

GERALD M. FORLENZA, *Examiner.*

A. GRANT, *Assistant Examiner.*